(12) United States Patent
Gutkowicz-Krusin et al.

(10) Patent No.: US 7,813,586 B2
(45) Date of Patent: Oct. 12, 2010

(54) REDUCING NOISE IN DIGITAL IMAGES

(75) Inventors: Dina Gutkowicz-Krusin, Princeton, NJ (US); Nikolai Kabelev, Irvington, NY (US)

(73) Assignee: MELA Sciences, Inc., Irvington, NY (US)

( * ) Notice: Subject to any disclaimer, the term of this patent is extended or adjusted under 35 U.S.C. 154(b) by 297 days.

(21) Appl. No.: 11/500,197

(22) Filed: Aug. 7, 2006

(65) Prior Publication Data

US 2008/0031537 A1    Feb. 7, 2008

(51) Int. Cl.
 G06K 9/40 (2006.01)
 G06K 9/00 (2006.01)
 G06K 9/64 (2006.01)
 H04N 5/217 (2006.01)
 H04N 9/64 (2006.01)

(52) U.S. Cl. ............. 382/275; 382/128; 382/254; 382/260; 382/278; 348/241; 348/243

(58) Field of Classification Search ........... 382/254, 382/275; 348/281, 241, 243
See application file for complete search history.

(56) References Cited

U.S. PATENT DOCUMENTS

| | | | |
|---|---|---|---|
| 4,142,213 A | 2/1979 | Glenn | |
| 4,200,934 A | 4/1980 | Hofmann | |
| 4,341,956 A | 7/1982 | Bax | |
| 4,599,654 A | 7/1986 | Monroe | |
| 4,606,004 A * | 8/1986 | Crawford et al. | 382/280 |
| 4,703,442 A | 10/1987 | Levine | |
| 4,739,495 A | 4/1988 | Levine | |
| 4,760,453 A | 7/1988 | Hieda | |
| 4,916,307 A | 4/1990 | Nishibe et al. | |
| 4,972,267 A | 11/1990 | Kaneko et al. | |
| 4,984,085 A | 1/1991 | Landowski | |
| 5,115,458 A | 5/1992 | Burkey et al. | |
| 5,153,732 A | 10/1992 | Oda et al. | |
| 5,216,511 A | 6/1993 | Tani | |
| 5,272,536 A | 12/1993 | Sudo et al. | |
| 5,343,061 A | 8/1994 | Yamashita et al. | |
| 5,355,164 A | 10/1994 | Shimoyama et al. | |
| 5,408,314 A | 4/1995 | Perry et al. | |
| 5,416,345 A | 5/1995 | Matsunaga | |
| 5,500,521 A | 3/1996 | Suzuki | |
| 5,508,740 A | 4/1996 | Miyaguchi et al. | |

(Continued)

OTHER PUBLICATIONS

Kokkinou et al., "Towards Room Temperature CCD Autoradiography: Methods for Minimizing the Effects of Dark Current at Room Temperature", Nuclear Science Symposium Conference Record, 2001 IEEE, vol. 3, Nov. 4-10, 2001, pp. 1624-1628.*

(Continued)

Primary Examiner—Anand Bhatnagar
Assistant Examiner—Jose M Torres
(74) Attorney, Agent, or Firm—Fish & Richardson P.C.

(57) ABSTRACT

A target digital image is received from an image sensor. The image is contaminated by noise of unknown magnitude that is represented by a reference digital image. A process is applied that uses statistical analysis of the target digital image and of the reference digital image to estimate a magnitude of the noise for at least some pixels of the target digital image.

25 Claims, 7 Drawing Sheets

U.S. PATENT DOCUMENTS

Figure 1:
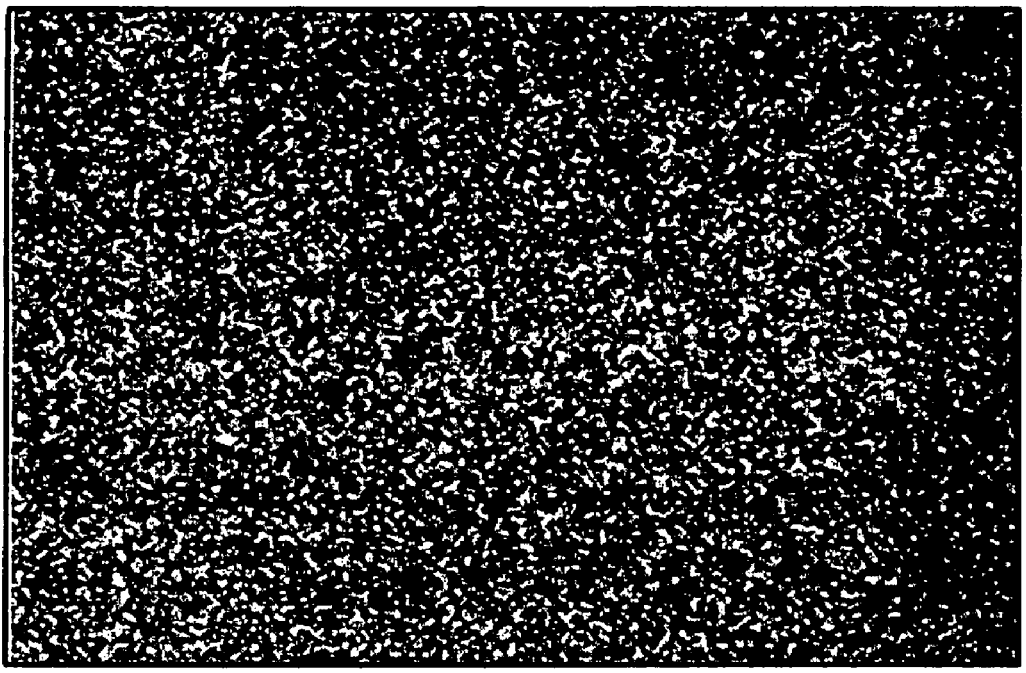

| | | | |
|---|---|---|---|
| 5,519,437 A | 5/1996 | Nelvig | |
| 5,565,674 A | 10/1996 | Reele | |
| 5,623,306 A | 4/1997 | Kajihara et al. | |
| 5,656,806 A | 8/1997 | Dautriche | |
| 5,926,214 A * | 7/1999 | Denyer et al. | 348/241 |
| 5,940,125 A | 8/1999 | Suganuma | |
| 6,081,612 A * | 6/2000 | Gutkowicz-Krusin et al. | 382/128 |
| 6,101,287 A | 8/2000 | Corum et al. | |
| 6,144,408 A * | 11/2000 | MacLean | 348/241 |
| 6,157,407 A | 12/2000 | Kobayashi | |
| 6,208,749 B1 * | 3/2001 | Gutkowicz-Krusin et al. | 382/128 |
| 6,271,054 B1 | 8/2001 | Ballantine et al. | |
| 6,271,880 B1 | 8/2001 | Kameshima et al. | |
| 6,351,519 B1 | 2/2002 | Bonk et al. | |
| 6,362,482 B1 | 3/2002 | Stettner et al. | |
| 6,369,853 B1 | 4/2002 | Merrill et al. | |
| 6,452,633 B1 | 9/2002 | Merrill et al. | |
| 6,525,769 B1 | 2/2003 | Thomas et al. | |
| 6,607,301 B1 | 8/2003 | Glukhovsky et al. | |
| 6,614,562 B1 | 9/2003 | Minemier | |
| 6,657,669 B1 | 12/2003 | Sato et al. | |
| 6,667,468 B2 | 12/2003 | Kurosawa et al. | |
| 6,700,654 B2 | 3/2004 | Gerrish et al. | |
| 6,707,557 B2 | 3/2004 | Young, Jr. et al. | |
| 6,714,241 B2 | 3/2004 | Baer | |
| 6,756,651 B2 | 6/2004 | Bozso et al. | |
| 6,798,456 B1 | 9/2004 | Sato | |
| 6,833,871 B1 | 12/2004 | Merrill et al. | |
| 6,917,380 B1 | 7/2005 | Tay | |
| 6,977,364 B2 | 12/2005 | Sander | |
| 6,982,757 B2 * | 1/2006 | Tariki | 348/243 |
| 6,995,795 B1 | 2/2006 | Losee et al. | |
| 7,015,448 B2 | 3/2006 | Barna | |
| 7,015,960 B2 | 3/2006 | Tay | |
| 7,053,354 B1 | 5/2006 | Luo et al. | |
| 7,064,406 B2 | 6/2006 | Mouli | |
| 7,064,785 B2 | 6/2006 | Prentice et al. | |
| 7,081,610 B2 | 7/2006 | Sander | |
| 7,102,672 B1 | 9/2006 | Jacobs | |
| 7,394,929 B2 * | 7/2008 | Lim et al. | 382/167 |
| 2002/0024605 A1 | 2/2002 | Merrill et al. | |
| 2003/0139672 A1 * | 7/2003 | Cane et al. | 600/473 |
| 2004/0183928 A1 | 9/2004 | Tay | |
| 2006/0262210 A1 * | 11/2006 | Smith et al. | 348/308 |
| 2007/0030365 A1 * | 2/2007 | Jerdev | 348/241 |

OTHER PUBLICATIONS

Johnson et al., Jun. 2000, "Dark Current Measurements on a State of the Art Near-IR HgCdTe 1024×1024 Array", Space Astrophysics Detectors and Detector Technologies Conference, Space Telescope Science Institute, Baltimore, Maryland.*

Burns et al., "Distilling Noise Sources for Digital Capture Devices", Proc. IS&T, 2001 PICS Conference, pp. 132-136.*

El Gamal et al., "Modeling and Estimation of FPN Components in CMOS Image Sensors", SPIE vol. 3301, 1998, pp. 168-177.*

International Search Report & Written Opinion for App. Ser. No. PCT/US2007/07533, dated Sep. 16, 2008, 12 pages.*

Albert Theuwissen et al., "Building a Better Mousetrap", *SPIE's Magazine*, pp. 29, Jan. 30-31, 2001.

"IBIS4 SXGA Image Sensor", *IBIS4 1.3 Megapixel CMOS APS*, (Feb. 12, 2001).

International Search Report & Written Opinion for App. Ser. No. PCT/US2007/075333, dated Sep. 16, 2008, 15 pages.

International Preliminary Report on Patentability for App. Ser. No. PCT/US2007/075333, dated Feb. 10, 2009, 10 pages.

* cited by examiner

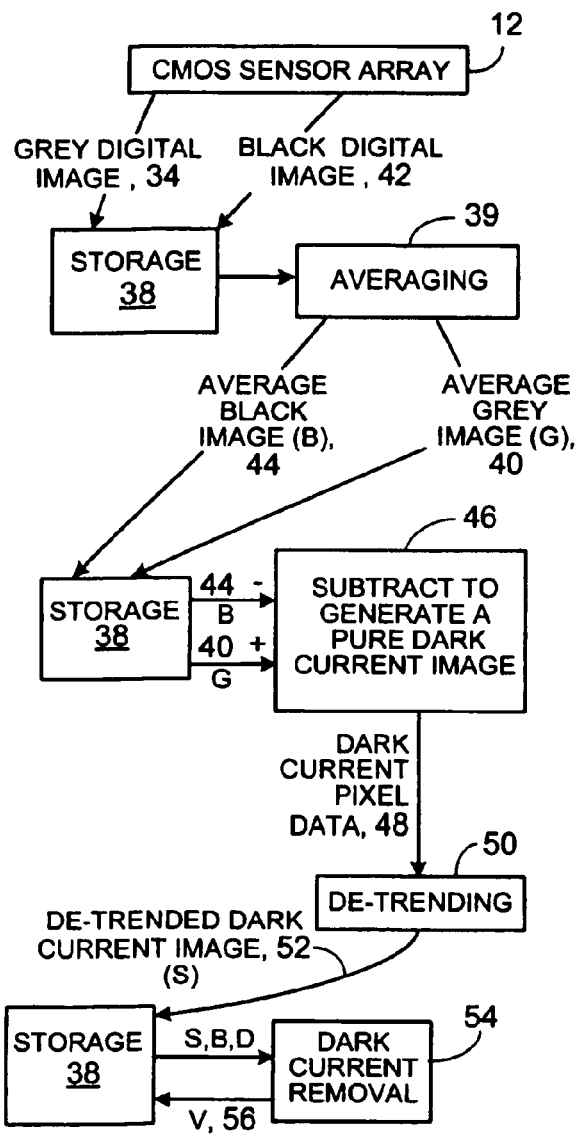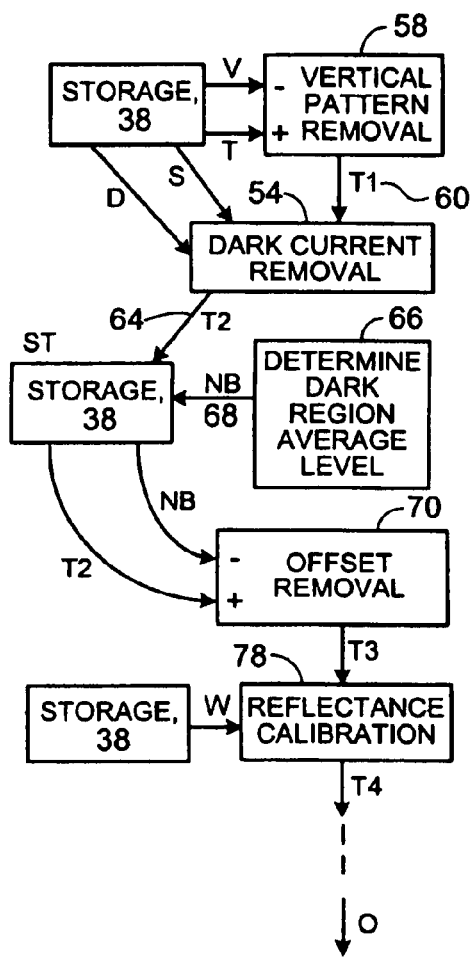
FIG. 4A
FIG. 4B

REDUCING NOISE IN DIGITAL IMAGES

This description relates to reducing noise in digital images.

When features that appear in digital images, for example in digital images produced by a CMOS image sensor, are to be to quantitatively analyzed (for example, in medical applications), it is useful to reduce or remove the noise from the images before the analysis. It also is useful to reduce or remove the noise from the images in cases for which the signal that produces the digital images is low relative to the noise.

One kind of noise in the pixel values that make up the image (called dark current noise, see FIG. 1) represents random noise levels that are produced by respective pixels of the CMOS sensor array whether or not light is being received by the sensor. (We sometimes use the word pixel in two different senses, one to refer to the photosensitive element that resides at a particular location on the sensor array and the other to refer to the picture element that resides at a particular location on the image and has a value that corresponds to brightness. We sometimes use the term digital image to refer to the array of pixel values that make up the image.) Aside from temperature, the physical characteristics of each sensor pixel that govern its dark current level do not change over time. The pixel's dark current level does, however, depend on the temperature of the pixel. And the pixel's dark current causes charge to build up over time, so that the effect of dark current on a pixel value depends on the duration of exposure of the pixel.

Other artifacts in the images include vertical patterns (also called fixed pattern noise), offset, and shot noise. Vertical patterns (see FIG. 2) are due to unintended differences in the operations of the respective readout circuits of different columns of the array and generally do not change over time. Offset represents differences in overall signal level (brightness) from image to image that result from variations in certain electrical properties of the readout circuitry. Each pixel value generated by the sensor array includes random shot noise with variance proportional to the signal value.

Digital images produced by other kinds of image sensors can also be subject to dark current noise.

SUMMARY

In general, a target digital image is received from an image sensor. The image is contaminated by noise of unknown magnitude that is represented by a reference digital image. A process is applied that uses statistical analysis of the target digital image and of the reference digital image to estimate a magnitude of the noise for at least some pixels of the target digital image.

Implementations may include one or more of the following features. The sensor is a CMOS sensor or a CCD sensor. The noise comprises dark current noise. The process estimates the dark current magnitude for every pixel of the target digital image. The process comprises program instructions. The statistical analysis includes a de-correlation analysis with respect to the target digital image and the reference digital image. The dark current magnitude estimates are produced without requiring information about a temperature of the sensor or a duration of exposure. The reference digital image is based on a dark current digital image that is substantially free of vertical patterns and has been generated from a grey digital image and a black digital image acquired respectively using different exposure periods. The reference digital image is based on a corrected dark current digital image that has been processed to reduce the effect of low-frequency spatial trends across the pixels of the CMOS sensor. The reference digital image is based on a de-correlation of the black digital image with the de-trended dark current image. The process subtracts vertical patterns, pixel by pixel, from the target digital image to produce a vertical pattern corrected digital image. The process applies a dark current removal function to the vertical pattern corrected digital image to produce a dark current corrected digital image. The noise in every pixel of the target digital image is reduced using the estimated dark current levels. The process applies an offset estimation and subtraction function to the dark current corrected digital image to remove offset. The noise reduced target digital image is provided to a processor for use in analyzing features of an image captured by the CMOS sensor. The target digital image includes possibly malignant lesions.

These and other features and aspects may be expressed as apparatus, methods, systems, program products, and in other ways.

Other advantages and features will become apparent from the following description and from the claims.

DESCRIPTION

Figure 2:
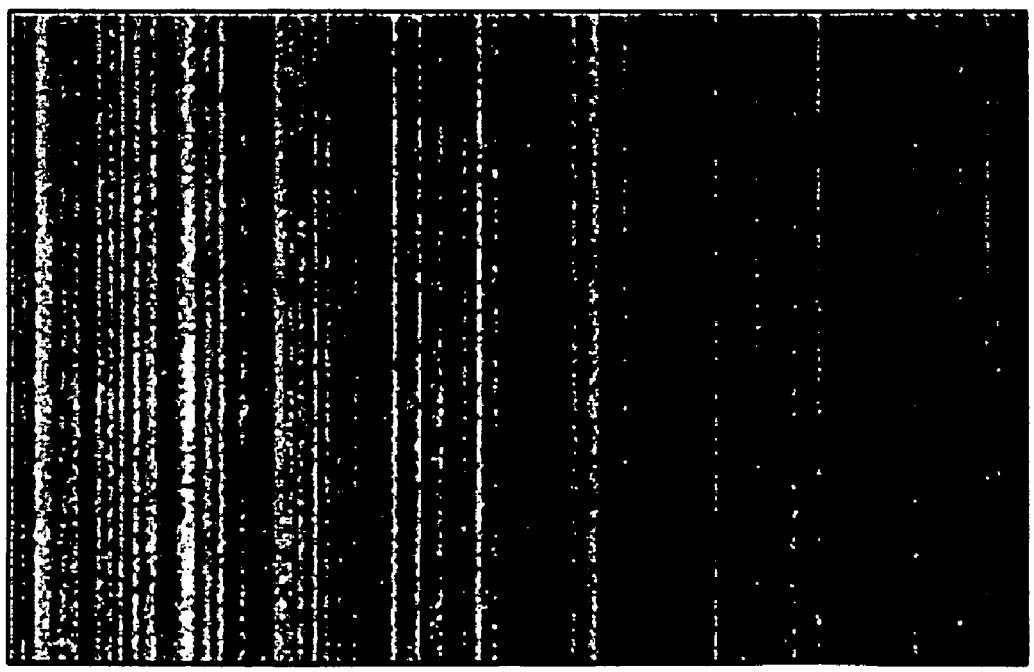
Figure 3:
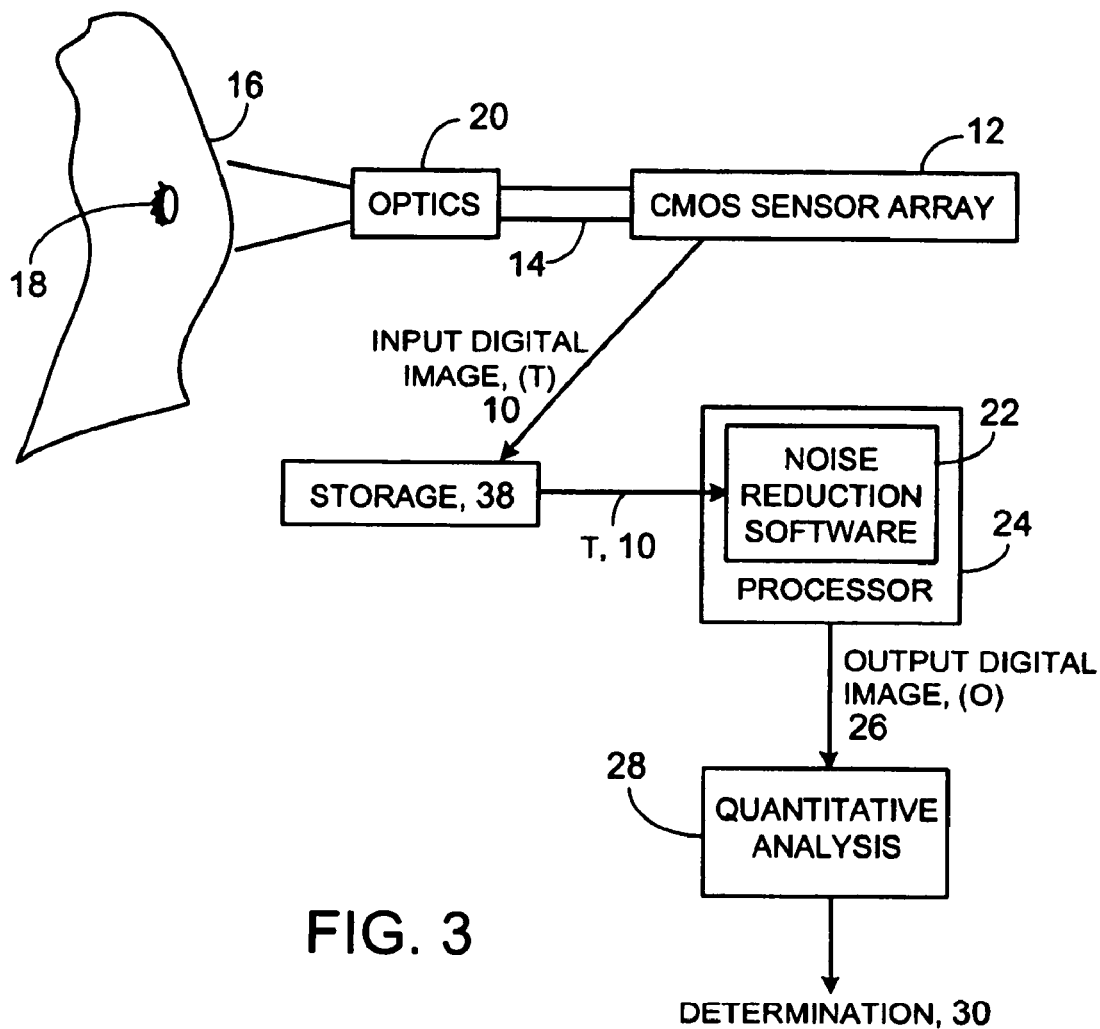
Figure 5:
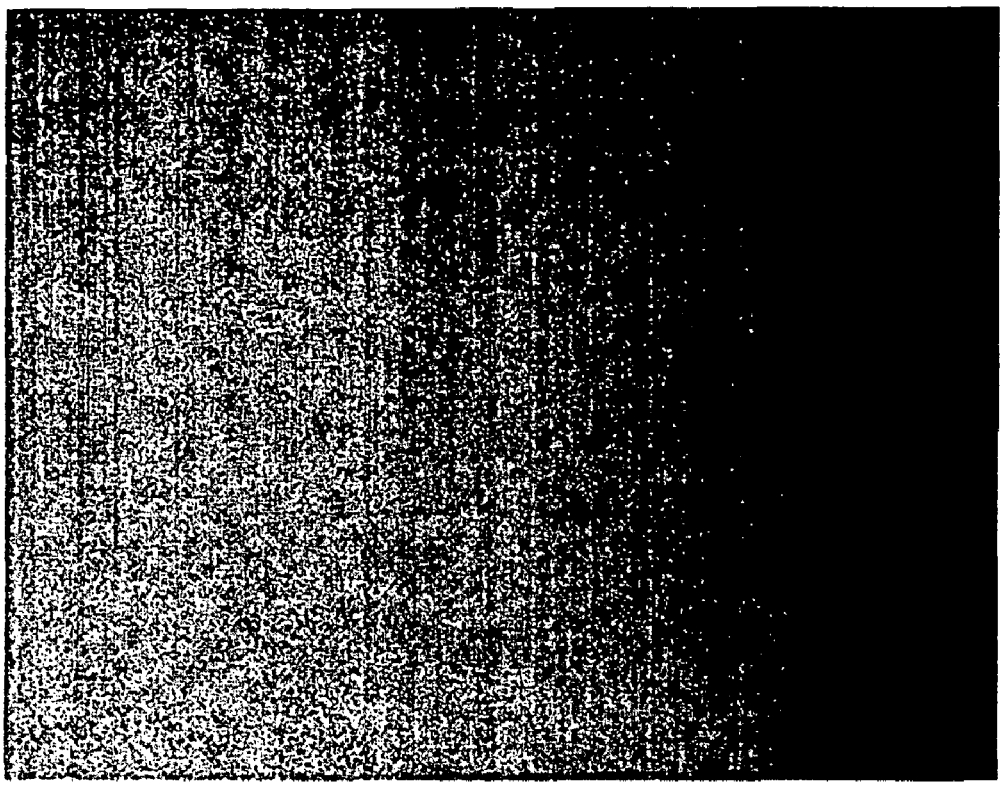
Figure 6:
Figure 7:
Figure 8:
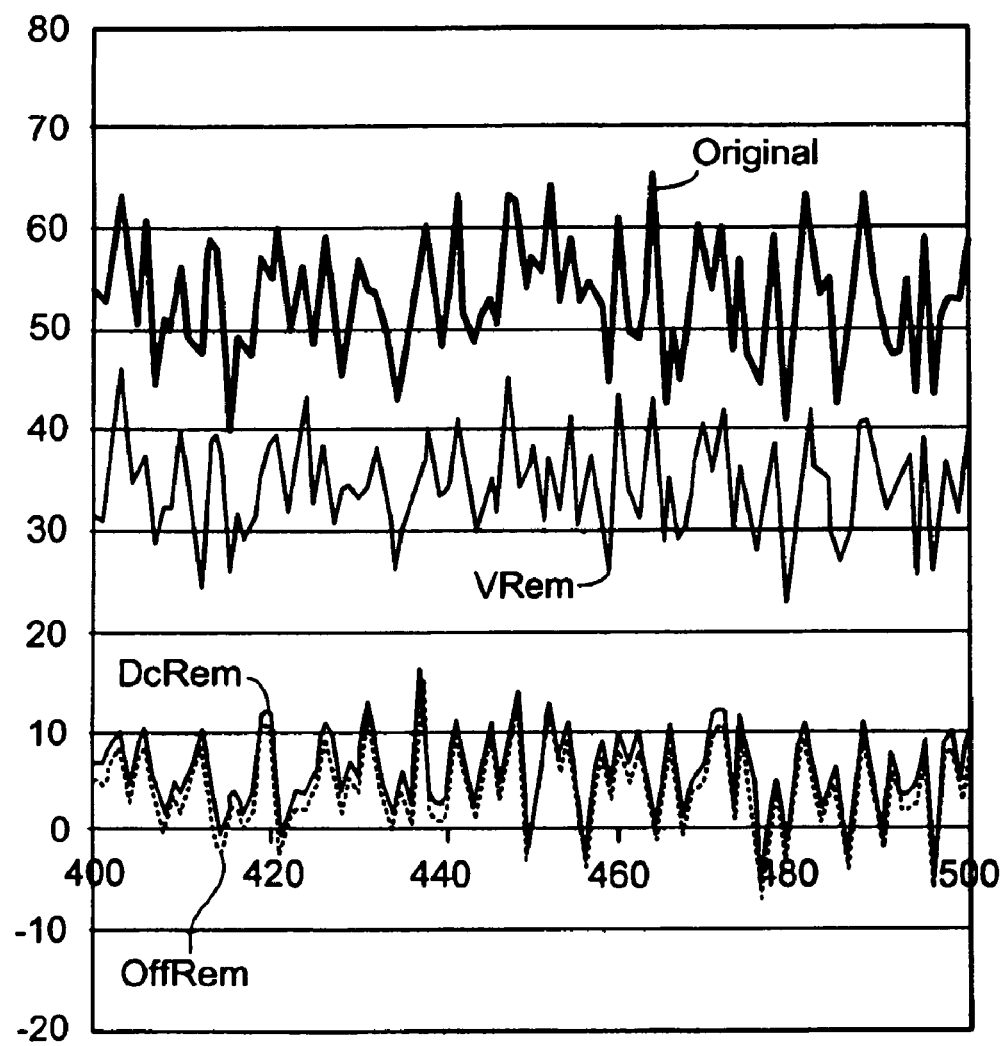
Figure 9:
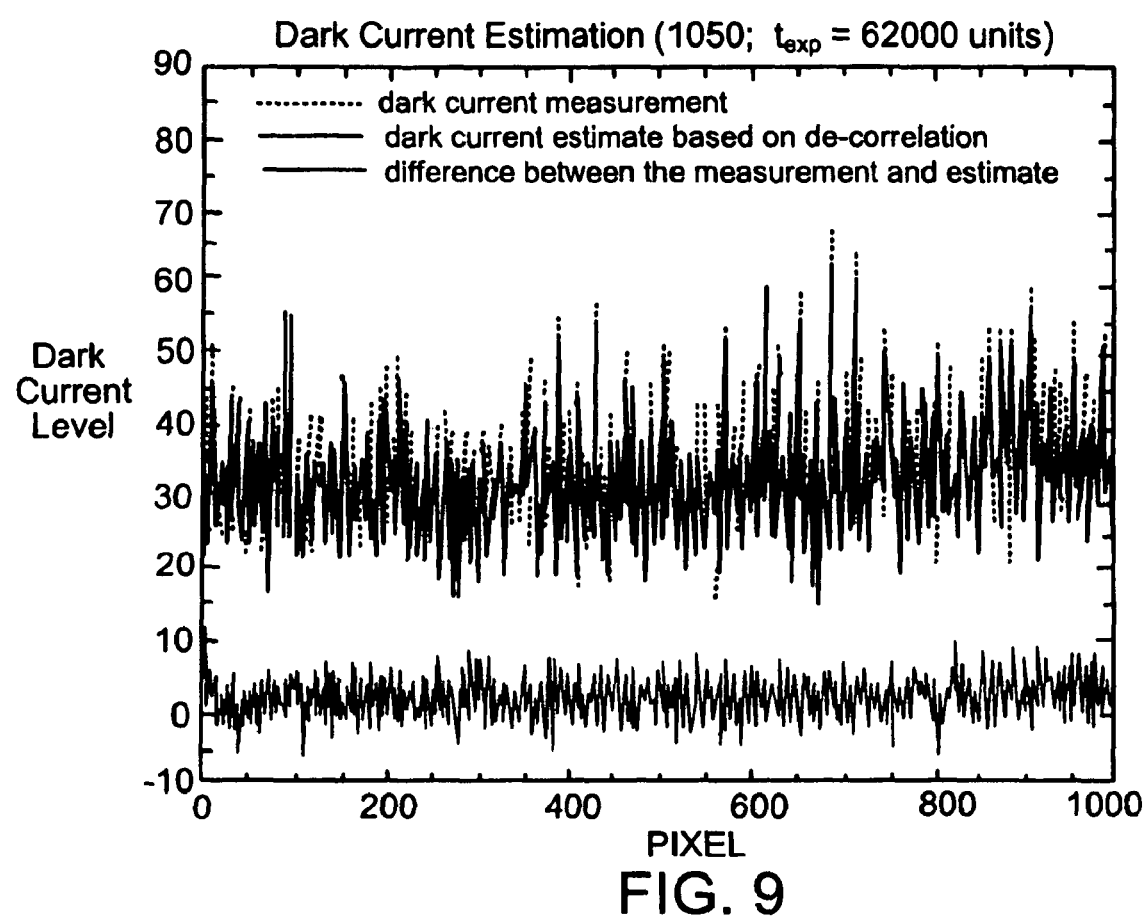

FIG. 1 is an image of dark current.
FIG. 2 is an image of vertical patterns.
FIGS. 3, 4A, and 4B are schematic flow diagrams.
FIGS. 5, 6, and 7 are images at stages of the calibration process.
FIGS. 8 and 9 are graphs.

As shown in FIG. 3, an input digital image 10 (which we call T, for target) generated by a CMOS sensor array 12 in response to light 14 received through optics 20 from a target scene 16 (for example, skin with a pigmented lesion 18) can be processed (after temporary storage in storage 38) by noise reduction software 22 (run by a processor 24) to produce an output digital image 26 (which we call O) for use in quantitative analysis 28 (for example, to determine 30 whether the lesion is a malignant melanoma, using the MelaFind® melanoma detection product of Electro-Optical Sciences, Inc., of Irvington, N.Y.).

Even though we describe an example in which the noise reduction is performed on a digital image in the context of medical diagnosis, the noise reduction process is applicable broadly to any digital image produced by a any image sensor array for any purpose and in any context, including any in which the noise-reduced digital image may be subjected to later analysis for which noise in the digital image would be problematic.

Although we also describe specific ways to reduce vertical patterns and offset, we note that the technique for reducing dark current (and other noise that can be characterized by a reference digital image) in the digital image described here can be used in a wide variety of applications in the absence of vertical patterns and offset or in which other kinds of noise may or may not be reduced and, if reduced, in which the reduction may or may not be done in the way described in the example described here.

Other kinds of processing may also be required with respect to digital images produced by sensors in various applications, including processing to correct optical effects associated with a specific lens and illuminator. The noise reduction techniques described here thus have applications not limited by any optical correction or optical correction of a particular kind.

As shown in FIGS. 4A and 4B, prior to noise-reduction processing of the input digital image, reference information is acquired and processed.

In one step in developing reference information, multiple independent sets of a grey digital image 34 are acquired in the dark at a known or unknown sensor temperature and stored in storage 38. The exposure time is in an intermediate range to avoid saturation from long exposures and yet have a reliable measurement of dark current. FIG. 5 shows an example of a grey image acquired in the dark (intensities multiplied by 15 for display purposes.)

The multiple grey digital images are averaged (39) to produce an average grey digital image 40 (which we call G) in which the level of shot noise at the individual pixels is reduced.

Also prior to noise-reduction processing of the input digital image, multiple independent sets of a black digital image are acquired in the dark, if fixed pattern noise such as vertical patterns is present. The exposure time for the black sets is shorter than for grey sets (for example, as short an exposure time as the hardware permits) to have a reliable measurement of the fixed pattern noise and to minimize the dark current level in the black sets.

The multiple black images are averaged (39) to produce an average black digital image 44 (which we call B) in which the effect of shot noise at the individual pixels is reduced, as it was for the average grey digital image.

The average black digital image B is subtracted (46) from the average gray digital image G to produce a dark current digital image 48 (D). The subtraction of the black digital image from the gray digital image produces an image of pure dark current (free of vertical patterns). FIG. 6 shows the image of FIG. 5 after subtraction of the vertical patterns (intensities multiplied by 15 for purposes of display).

Next, a de-trending function is applied (50) to the dark current digital image 48 to remove low-frequency spatial trends from the pixels of the data 48, because the trend in the dark current digital image can be correlated with the target digital image. This de-trending is done by subdividing the entire array of the dark current digital image 48 into sub-arrays of N pixels by N pixels. Within each sub-array, the dark current digital image values are fit to a quadratic function of two variables, using a least-squares fit. The value of this quadratic function for each pixel is then subtracted from the actual dark current value in that pixel. In practice, good results have been obtained with N=3. The result is a de-trended dark current digital image 52 (S).

Next, a pure vertical pattern digital image V 56 is generated by first applying a dark current removal function (54) to B. The removal function in general returns a digital image that represents the difference, pixel by pixel, between (i) an input digital image B and (ii) a product of the dark current digital image D times a factor A1

$$V = B - A1*D,$$

where the de-correlation function finds a factor A1 with respect to two sets of digital image, B and S:

$$\text{Correlation } (B - A1*S, S) = 0,$$

where the correlation is computed over all pixels in a specified region of the image.

In other words, the de-correlation function determines a factor A1 that de-correlates the digital image B from the digital image S over some region of the image. With respect to the particular step 54 in FIG. 4, the de-correlation determines the magnitude (A1) of dark current D in the black image B.

The de-correlation function is an example of a statistical analysis that enables the dark current noise to be determined from target pixels and from reference pixels without the need to know the temperature of the sensor or the period of exposure. Other statistical approaches could also be used, such as a variance minimization analysis. The result of step 54 in the figure is the pure vertical pattern digital image V 56.

FIG. 7 shows the image of FIG. 6 after subtraction of dark current noise (intensities multiplied by 15 and 100 levels were added to each pixel for display purposes).

FIG. 8 provides a graphical illustration of cross sections of the images of FIGS. 5, 6, and 7 without intensity adjustments. In FIG. 8, VRem is the intensity after subtraction of fixed pattern noise; DCRem is the intensity after subtraction of fixed pattern noise and of dark current; OffRem is the intensity after subtraction of fixed pattern noise, of dark current, and of offset. In the original image of FIG. 5, shot noise is about 7-8 levels, and it is not removed by the calibration process. Reduction of the shot noise would require either spatial or temporal averaging of images.

The steps described above need only be performed once, e.g., during factory calibration, and the resulting calibration digital images can be stored and used for a large number of target images over a long period of time. It is not necessary to develop the calibration image information again each time a target image is captured.

As shown in FIG. 4B, to reduce noise in T, the pure vertical pattern digital image V is subtracted (58), pixel by pixel, from T to yield a vertical pattern corrected digital image T1 60:

$$T1 = T - V.$$

Next, using the de-correlation function (54) over some region of the image, the magnitude A2 of dark current D in that region of the image T1 is determined from $$\text{Correlation } (T1 - A2*S, S) = 0,$$

and then the dark current is removed from T1 to produce a dark current corrected digital image T2 64:

$$T2 = T1 - A2*D.$$

The CMOS sensor can be arranged to have a black region (for example, in a corner or along one of the edges) of the array which is screened from light (including any light from a target). The digital image from the black region can be used to correct for offset in the image. The black region digital image is first processed by the vertical pattern removal and dark current removal steps described earlier and the resulting processed black region data are averaged 66 to produce an average black region value NB 68. The average black region value is subtracted 70 from every pixel of the dark current corrected digital image T2 of an image to eliminate offset from the target image. The resulting offset corrected digital image T3 can be subjected to additional processing depending on the circumstances.

For example, if it is of interest to remove artifacts from the digital image T3 due to non-uniformities imparted by the imaging system (such as non-uniform target illumination or non-uniform sensor response) or to determine actual reflectances in the digital image T3, a calibration digital image W may be acquired by imaging a uniform white target with a known diffuse reflectance. This white target digital image is then subjected to a series of operations that include vertical pattern removal (subtracting V, if applicable), determination of the magnitude of dark current by applying de-correlation to W−V and S, dark current removal, and offset removal, to produce W1. A reflectance calibration 78 may be applied to the digital image T3 to produce a reflectance digital image T4 by the following computation (performed pixel by pixel):

$$T4=(T3/W)*(E(W)/E(T3))*\rho$$

in which E is the exposure time, and p is reflectance of a white calibration target. The reflectance calibrations 78 removes from the digital images T3 non-uniformities imparted by the imaging system. across the sensor, dark current could be estimated independently at different parts of the sensor and the independent estimates applied separately to the corresponding portions of the input digital image.

The process described above can be applied to monochromatic digital images provided by a sensor. In some examples, the process can be applied to multiple digital images in different spectral ranges that are produced simultaneously by the sensor (e.g., red, green, and blue—RGB). In such cases, the digital images in different spectral ranges may be processed independently as described above.

The process may take advantage of a statistical analysis to reduce the need, for some sensors, to control the temperature or duration of exposure as a way to reduce the effects of dark current noise.

The processes described above could be implemented in hardware, software, or firmware, or any combination of them.

Validation of the dark current estimation technique was performed by comparing the dark current level retrieved from dark images specially taken at various exposure times in a climate-controlled environment against the dark current level predicted by the estimation technique described above. It was demonstrated that a de-correlation-based estimator is able to predict accurately the actual dark current level in individual images even in the presence of unavoidable shot noise, as illustrated in FIG. 9.

Other implementations are within the scope of the claims. For example, a variance minimization analysis could be substituted for the de-correlation analysis.

The techniques described here may be useful not only for sensors operating in the visible and infrared ranges but also for x-rays and possibly ultrasound, that is, for any sensors for which removal of dark current noise or effects similar to dark current noise would be useful.

Although the discussion above is directed to dark current noise correction, similar techniques could be applied in other contexts in which any noise for which a reference image is known or can be obtained and in which the magnitude of the noise in the target digital image is unknown.

The invention claimed is:

1. A method comprising:
   determining an unknown amplitude A of noise that contaminates at least some of the pixels of a digital image T of an arbitrary target, the amplitude being possibly different in different digital images, the determination being based on the digital image T and on a reference digital image that is representative of the contaminating noise and obtained by the same sensor,
   the determination being made from a decorrelation condition: Correlation (T−A*{the reference digital image}, {the reference digital image})=0,
   the determination being made over pixels in some regions of T and the reference digital image, to estimate the amplitude of the noise for each of at least some pixels of T.

2. The method of claim 1 in which the sensor comprises a CMOS sensor.

3. The method of claim 1 in which the sensor comprises a CCD sensor.

4. The method of claim 1 in which the noise comprises dark current noise.

5. The method of claim 4 in which a magnitude of the dark current noise is estimated for every pixel of T to use in producing a dark current corrected version of T.

6. The method of claim 4 in which the reference digital image is based on a dark current digital image that is substantially free of vertical patterns and has been generated from a grey digital image and a black digital image acquired respectively using different exposure times.

7. The method of claim 4 in which the reference digital image is based on a corrected dark current digital image that has been processed to reduce the effect of low-frequency spatial trends across the pixels of the sensor.

8. The method of claim 4 in which the reference digital image is based on a de-correlation of a black digital image with a de-trended dark current digital image.

9. The method of claim 4 in which the reference digital image is obtained from the sensor without external light.

10. The method of claim 5 in which the dark current noise amplitude is estimated without requiring information about a temperature of the sensor or a duration of exposure.

11. The method of claim 5 also including reducing noise in every pixel of T using the estimated dark current noise magnitudes for all of the pixels to produce a noise reduced T.

12. The method of claim 11 also including providing the noise reduced T to a processor for use in analyzing features of an image captured by the sensor.

13. The method of claim 12 in which the images include possibly malignant lesions.

14. The method of claim 1 in which determining A comprises executing program instructions.

15. The method of claim 1 also comprising subtracting fixed vertical patterns, pixel by pixel, from T, to produce a vertical pattern corrected T.

16. The method of claim 15 also comprising applying a dark current removal function to the vertical pattern corrected T to produce a dark current corrected T.

17. The method of claim 16 also comprising applying an offset estimation and subtraction function to the dark current corrected T to remove offset.

18. The method of claim 1 in which the image sensor comprises a monochromatic sensor.

19. The method of claim 1 in which the image sensor comprises a sensor that images in two or more different spectral bands simultaneously.

20. The method of claim 19 in which the image sensor images in red, green, and blue bands (RGB).

21. The method of claim 1 in which the image sensor produces images in the visible or infrared ranges.

22. The method of claim 1 in which the image sensor produces images using X-ray or ultrasound radiation.

23. An apparatus comprising
   a software processor configured to
   determine an unknown amplitude A of noise that contaminates at least some of the pixels of a digital image T of an arbitrary target, the amplitude being possibly different in different digital images, the determination being based on the digital image T and on a reference digital image that is representative of the contaminating noise and obtained by the same sensor,
   the determination being made from a decorrelation condition: Correlation (T−A*{the reference digital image}, {the reference digital image})=0, the determination being made over pixels in some regions of T and the reference digital image, to estimate the amplitude of the noise for each of at least some pixels of T.

24. The apparatus of claim 23 also comprising a device to analyze T, in which noise has been reduced using the estimated noise amplitude, to determine a presence or absence of a possibly malignant lesion.

25. An apparatus comprising
  means for receiving pixels of a digital image T, and
  means for determining an unknown amplitude A of noise that contaminates at least some of the pixels of a digital image T of an arbitrary target, the amplitude being possibly different in different digital images, the determination being based on the digital image T and on a reference digital image that is representative of the contaminating noise and obtained by the same sensor,
  the determination being made from a decorrelation condition: Correlation (T−A*{the reference digital image}, {the reference digital image})=0,
  the determination being made over pixels in some regions of T and the reference digital image, to estimate the amplitude of the noise for each of at least some pixels of T.

* * * * *